(12) United States Patent
Adams et al.

(10) Patent No.: US 7,195,725 B2
(45) Date of Patent: Mar. 27, 2007

(54) METHOD OF MAKING AN INTEGRATED DOOR INNER PANEL AND AN ARTICLE MADE THEREBY

(75) Inventors: Robert J. Adams, Ypsilanti, MI (US); Kenneth W. Shaner, Howell, MI (US); Nelson E. Williams, Jr., Saline, MI (US); John D. Youngs, Southgate, MI (US); Glenn A. Cowelchuk, Chesterfield, MI (US)

(73) Assignee: Lear Corporation, Southfield, MI (US)

( * ) Notice: Subject to any disclaimer, the term of this patent is extended or adjusted under 35 U.S.C. 154(b) by 185 days.

(21) Appl. No.: 10/911,122

(22) Filed: Aug. 4, 2004

(65) Prior Publication Data

US 2006/0028047 A1   Feb. 9, 2006

(51) Int. Cl.
  *B29C 44/06* (2006.01)
(52) U.S. Cl. ............ 264/46.4; 264/46.6; 264/255; 264/257; 264/309
(58) Field of Classification Search .............. 264/46.4, 264/46.6, 255, 309, 257
See application file for complete search history.

(56) References Cited

U.S. PATENT DOCUMENTS

| | | | |
|---|---|---|---|
| 3,927,161 A | 12/1975 | Powell et al. | |
| 5,082,609 A | 1/1992 | Rohrlach et al. | |
| 5,389,317 A | 2/1995 | Grimmer | |
| 5,439,630 A | 8/1995 | Gallagher et al. | |
| 5,512,233 A | 4/1996 | Gallagher et al. | |
| 5,571,597 A | 11/1996 | Gallagher et al. | |
| 5,626,382 A * | 5/1997 | Johnson et al. | 296/146.7 |
| 5,662,996 A | 9/1997 | Jourquin et al. | |
| 5,744,231 A | 4/1998 | Igarashi et al. | |
| 5,885,662 A | 3/1999 | Gardner, Jr. | |
| 6,013,210 A | 1/2000 | Gardner, Jr. | |
| 6,017,617 A | 1/2000 | Gardner, Jr. | |
| 6,248,200 B1 | 6/2001 | Dailey et al. | |
| 6,391,232 B1 | 5/2002 | Fritsch | |
| 6,544,449 B1 | 4/2003 | Gardner | |
| 6,616,216 B2 | 9/2003 | Furuyama et al. | |
| 2001/0001687 A1 | 5/2001 | Pokorzynski | |
| 2002/0047289 A1 | 4/2002 | Furuyama et al. | |
| 2004/0169400 A1 | 9/2004 | Langhoff et al. | |

FOREIGN PATENT DOCUMENTS

| | | |
|---|---|---|
| JP | 7112442 A | 5/1995 |
| WO | WO 98/47684 | 10/1998 |

\* cited by examiner

*Primary Examiner*—Allan R. Kuhns
(74) *Attorney, Agent, or Firm*—Brooks Kushman P.C.

(57) ABSTRACT

A method of making an integrated inner trim panel for a vehicle door and an inner trim panel made thereby are disclosed. The method includes sequentially spraying a skin layer, a padding layer, and applying a structural layer in an open mold that defines the facing surface of the inner panel of a door. The integrated inner trim panel may be provided with areas of greater and lesser padding. The skin layer may be formed from a reactant mixture of polyurethane. The padding layer may be a foam polyurethane composition. The structural layer may be a glass-reinforced polyurethane reactant mixture. The inner door panel is an integrated layered structure including a skin layer, a padding layer, and a structural layer. The padding layer may be varied in thickness to provide selectively variable padding in predetermined areas.

9 Claims, 1 Drawing Sheet

US 7,195,725 B2

METHOD OF MAKING AN INTEGRATED DOOR INNER PANEL AND AN ARTICLE MADE THEREBY

BACKGROUND OF THE INVENTION

1. Field of the Invention

The present invention relates to an interior trim panel for a vehicle door and a method making the interior trim panel.

2. Background Art

Vehicle doors are complex subassemblies that include a window, a window regulator mechanism, door latches and locks, electrical switches, audio speakers and decorative interior trim. Vehicle doors normally include a sheet metal door having an outer panel and an inner panel. Side impact beams, mounting brackets and braces are also generally provided between the inner and outer sheet metal door panels. The above accessories are assembled to the door during the door assembly process through access openings in the inner door.

An inner trim panel is assembled to the door inner panel to complete the door assembly process. Inner trim panels generally include an armrest, a bolster panel above the armrest, padded windowsills, escutcheons for door handles, map pockets, and the like. Conventional inner trim panels for vehicle doors generally require assembly of the armrest, the bolster panel, and other covered padded areas. Assembly may require fasteners and adhesives. Assembly of inner trim panels is labor intensive. The more pieces that must be assembled together to form the inner trim panel, the greater the cost that is incurred for separate fabrication of individual parts, individual assembly operations.

Inner trim panels for vehicle doors are generally constructed of polyethylene, polystyrene or polyvinyl polymers. In addition, surface covering materials may include leather, cloth or pile carpet materials in a wide variety of combinations. Many of the materials used to form inner trim panels for vehicle doors incorporate substantial quantities of volatile organic compounds. Such materials tend to degrade over time. Recently efforts have been made to develop vehicle interior trim components that incorporate a polyurethane skin to obtain the benefits, durability and chemical properties of polyurethane materials.

There is a need for an inner trim panel of a vehicle door and a method of making such a panel that integrates as many as possible of the component parts into an integrated whole. By integrating as many parts as possible into the basic inner trim panel, considerable savings can be achieved by reducing labor expense, reducing part counts, eliminating the need for fasteners and reducing the number of assembly operations. It is vital that a high quality interior panel be provided that reduces assembly time and reduces the number of assembly operations required to manufacture the inner trim panel of the vehicle door.

The above problems and needs are addressed by applicants' invention as summarized below.

SUMMARY OF THE INVENTION

One aspect of the present invention relates the method of making an integrated trim panel for a vehicle door. The method comprises providing an open mold that defines a facing surface of the inner panel of the door but also defines an additional component such as a cavity for forming an armrest. A skin layer is then sprayed on the facing surface and into the armrest cavity with a spray tool that sprays a reactant mixture of polyurethane. A padding layer is then sprayed onto the opposite side of the skin layer from the facing surface and the armrest cavity. The armrest cavity may be sprayed to a first thickness on a first portion of the armrest cavity and to a second thickness on a second portion of the armrest cavity that is thinner than the first portion. The padding layer is sprayed with a spray tool that sprays a reactant mixture comprising a polyurethane reactant mixture and a blowing agent. During the step of spraying the padding layer a void is left in the padding layer within the armrest cavity. A structural layer is then applied onto the padding layer on the opposite side of the padding layer from the skin layer. The structural layer partially or completely fills the void in the armrest cavity. The structural layer covers the padding layer opposite the facing surface and comprises a reaction mixture of polyurethane reactant mixture and a glass fiber reinforcement material.

According to other aspects of the method, a core may be inserted and supported in the void in the padding layer before filling the void in the armrest cavity. The armrest cavity may have a planar surface that is generally perpendicular to the facing surface and a contoured surface that interconnects a distal end of the planar surface to the facing surface. The padding layer is sprayed into the first portion of the armrest cavity behind the planar surface. The padding layer is sprayed into the second portion of the armrest cavity behind the contoured surface.

According to other aspects of the method of the present invention relating to the composition, the skin layer may comprise polyol and isocyanate while the padding layer is formed by polyol and isocyanate and a blowing agent. The structural layer further comprises a heated reactant mixture and a glass fiber reinforcement material. The glass fiber reinforcement material may be either chopped glass fibers or a glass fiber mat.

Further aspects of the invention relate to the construction of the inner door panel. The inner door panel has a wall portion and an arm rest portion. A skin layer extends over the entire wall portion and arm rest portion. A padding layer forms a backing for the skin behind the wall portion and the arm rest portion. A structural layer backs the padding layer behind the wall portion and the arm rest portion to provide structural support for the wall portion and arm rest portion. The skin layer, padding layer and structural layer each may include a polyurethane resin. The padding layer is formed with a blowing agent to create foam polyurethane. The structural layer further comprises glass reinforced polyurethane that may be in the form of chopped glass fibers or a glass fiber mat.

According to other aspects of the invention as they relate to the construction of the door panel, the arm rest portion has an upper surface that is configured to receive an occupant's arm and a contoured portion. The upper surface has a first thickness of padding layer and the contoured portion has a second thickness of the padding layer such that the first thickness is greater than the second thickness to provide an upper arm rest surface that is softer than the wall portion. The thickness of the padding layer behind the wall portion generally corresponds to the second thickness. However, the thickness of the padding layer behind the wall portion may comprise some portions of the first thickness and other of the second thickness. The inner door panel also may include a structural layer that defines a void within the arm rest.

DETAILED DESCRIPTION OF THE PREFERRED EMBODIMENT

Figure 1:
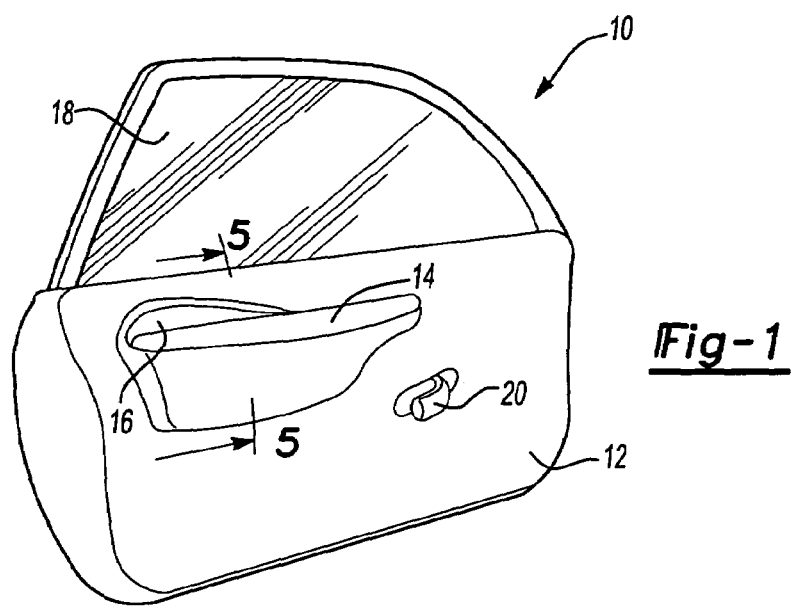
FIG. 1 is a perspective view of a vehicle door having an interior trim panel made according to the present invention.

Referring to FIG. 1, a vehicle door 10 having an interior trim panel 12 is illustrated. The interior trim panel 12 features an armrest 14 and a bolster 16 that are integrally formed according to the disclosed process. A window 18 is provided in the door that may be operated by means of a manual or automatic window regulator mechanism. In addition, a door handle 20 is conventionally provided for opening the vehicle door 10.

Figures 2, 3:
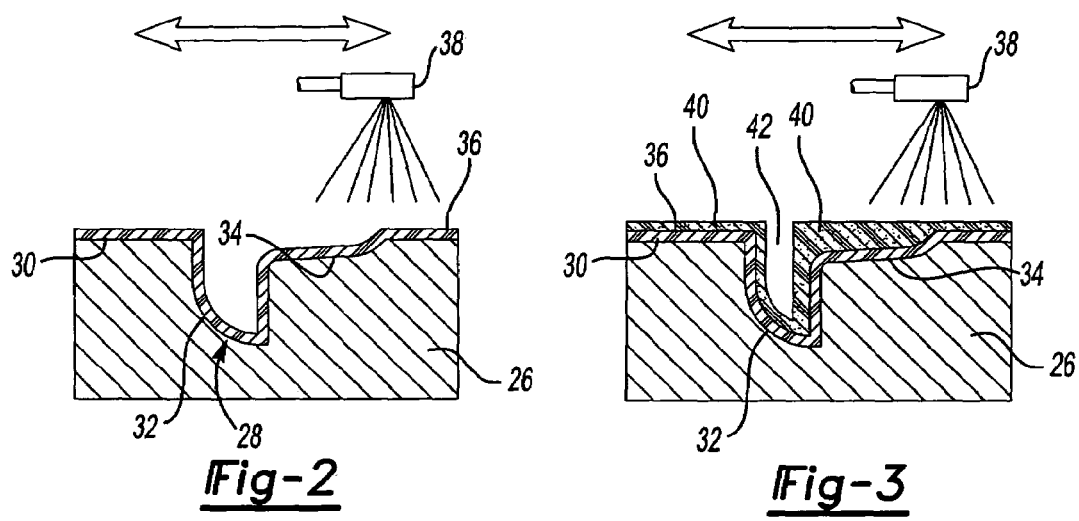
FIG. 2 is a diagrammatic cross-sectional view of an open mold on which skin layer is in the process of being sprayed with a spray tool.
FIG. 3 is a diagrammatic view similar to FIG. 2 showing a second step wherein a spray tool is used to apply a polyurethane foam padding layer.
Figure 4:
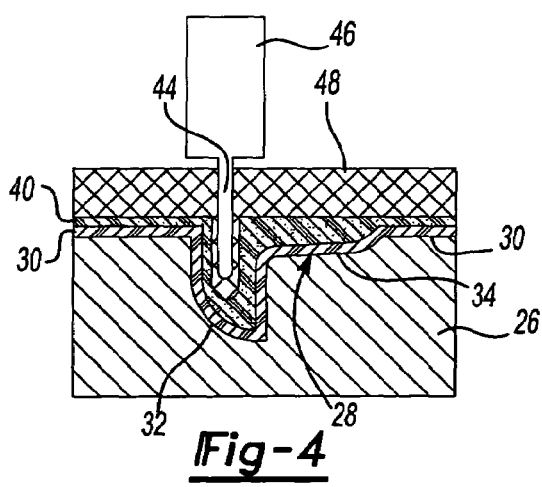
FIG. 4 is a similar view to FIG. 2 showing a third step in the process wherein a polyurethane glass reinforced structural layer is formed that supports the skin layer and padding layer.

Referring to FIGS. 2–4, a simple and effective process for manufacturing an inner trim panel 12 is illustrated. An open mold 26 defines a mold surface 28, or cavity. The mold surface 28 includes a face-forming surface 30, an armrest-forming surface 32, and a bolster-forming surface 34. The process begins by spraying a skin layer of polyurethane reactant mixtures comprising polyol and isocyanate that react on the mold surface to form the durable skin layer 36. The skin layer is applied using a spray tool 38 that sprays the polyurethane reactants onto the mold surface 28 in a series of swaths. The spray tool 38 may be manipulated by an articulated robot arm or other automated spray application equipment. The skin layer is preferably formed to a uniform thickness. However, it should be understood that some surface thickness variation is inherent in the process due to the fact that multiple overlapping spray paths are used to form the skin layer 36.

Referring to FIG. 3, a second step in the process is shown wherein a padding layer 40 is sprayed with the spray tool 38 (the spray tool may include interchangeable spray heads) onto the skin layer 36. The padding layer 40 may be a foam polyurethane composition including polyol and isocyanate combined with a blowing agent, such as a commercially available blowing agent, or water. As the padding layer 40 is formed, a void 42 may be left in the area of the armrest 14. The void 42 is provided to allow for added structural support for the armrest 14.

Referring to FIG. 4, a core 44 is shown disposed in the void 42. The core 44 is supported in the mold by means of a core support 46 that is diagrammatically illustrated. The core support 46 may be a bracket or a mold supported retaining member. After the core 44 is inserted in the void 42, a structural layer comprising polyurethane reactant mixture, including glass fiber reinforcement, may be sprayed or poured onto the padding layer 40. The glass fiber reinforced polyurethane material cures to a relatively rigid state. The structural layer 48 must be sufficiently rigid to support the padding layer 40 and skin layer 36 both prior to and after assembly to the vehicle door 10. After the core 44 is removed from the inner trim panel 12, a slot 50 is formed within the structural layer 48. The slot 50, for example, may receive a flange of the vehicle door 10 or a bracket that may be used to assemble the inner trim panel 12 to the vehicle door 10.

Figure 5:
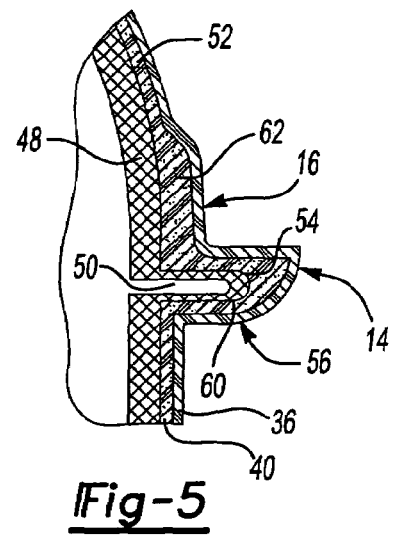
FIG. 5 is a cross-sectional view taken along the line 5—5 in FIG. 1.

Referring to FIGS. 3–5, one advantage of the present invention is that the thickness of the padding layer 40 may be varied in accordance with the specifications of the inner trim panel 12 design. A first padded region of the door 52 may be padded to a limited extent to provide a plush surface appearance and sound adsorption. A top padded portion 54 of the armrest 14 may be provided with a substantially thicker padding layer 40 to improve the comfort of the armrest for a vehicle occupant. The armrest 14 also includes a contoured portion 56 that is provided with a thinly padded region 60. The bolster 16 may also be provided with a thicker padded portion 62 that adds to the comfort provided by the bolster 16.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of making an integrated inner trim panel of a door for a vehicle comprising:

providing an open mold that defines a facing surface of the inner panel of the door, wherein the mold further defines an armrest cavity;

spraying a skin layer on the facing surface and into the armrest cavity with a spray tool that sprays a reactant mixture of polyurethane;

spraying a padding layer onto the opposite side of the skin layer from the facing surface and the armrest cavity, the armrest cavity being sprayed to a first thickness in a first portion of the armrest cavity and to a second thickness in a second portion of the armrest cavity that is thinner than the first portion with the spray tool that sprays a reactant mixture comprising a polyurethane reactant mixture and a blowing agent, inserting and supporting a core in a void in the padding layer before filling the void in the armrest cavity, and leaving the void in the padding layer within the armrest cavity; and applying a structural layer onto the padding layer on the opposite side of the padding layer from the skin layer, filling the void in the armrest cavity and covering the padding layer opposite the facing surface, the structural layer comprising a reaction mixture of a polyurethane reactant mixture and a glass fiber reinforcement material.

2. The method of claim 1 wherein the armrest cavity has a planar surface that is generally perpendicular to the facing surface and a contoured surface that interconnects a distal end of the planar surface to the facing surface.

3. The method of claim 2 wherein the padding layer is sprayed into the first portion of the armrest cavity behind the planar surface.

4. The method of claim 2 wherein the padding layer is sprayed into the second portion of the armrest cavity behind the contoured surface.

5. The method of claim 1 wherein the mixture of polyurethane sprayed to form the skin layer consists essentially of polyol and isocyanate.

6. The method of claim 1 wherein the mixture of polyurethane sprayed to form the padding layer consists essentially of polyol, isocyanate and a blowing agent.

7. The method of claim 1 wherein the step of providing the structural layer further comprises heating the reactant mixture and glass fiber reinforcement material in an oven.

8. The method of claim 1 wherein the glass fiber reinforcement material is a quantity of chopped glass fibers.

9. The method of claim 1 wherein the glass fiber reinforcement material is a glass fiber mat.

* * * * *